(12) United States Patent
Chadha et al.

(10) Patent No.: US 7,894,325 B2
(45) Date of Patent: **\*Feb. 22, 2011**

(54) RECEIVER ARCHITECTURE FOR PILOT BASED OFDM SYSTEMS

(75) Inventors: Kanu Chadha, Stafford, TX (US); Manish Bhardwaj, Cambridge, MA (US)

(73) Assignee: Edgewater Computer Systems, Inc., Ottawa, Ontario (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 12/291,905

(22) Filed: Nov. 14, 2008

(65) Prior Publication Data

US 2009/0073869 A1 Mar. 19, 2009

Related U.S. Application Data

(63) Continuation of application No. 10/713,562, filed on Nov. 14, 2003, now Pat. No. 7,453,792.

(60) Provisional application No. 60/426,215, filed on Nov. 14, 2002.

(51) Int. Cl.
*H04J 11/00* (2006.01)
(52) U.S. Cl. .................................................. 370/203
(58) Field of Classification Search ................ 370/203, 370/208, 328, 310, 464, 474; 375/322, 324, 375/329, 334, 335, 340
See application file for complete search history.

(56) References Cited

U.S. PATENT DOCUMENTS

| | | | |
|---|---|---|---|
| 5,206,886 A | 4/1993 | Bingham | |
| 5,228,062 A | 7/1993 | Bingham | |
| 6,151,295 A | 11/2000 | Ma et al. | |
| 6,546,056 B1 | 4/2003 | Rosenlof | |
| 6,577,690 B1 * | 6/2003 | Barman et al. | ............... 375/354 |
| 6,628,724 B2 | 9/2003 | Bannasch et al. | |
| 6,628,735 B1 | 9/2003 | Belotserkovsky et al. | |

(Continued)

OTHER PUBLICATIONS

Abhayawardhana, V.S., and Wassell, I.J., "Residual Frequency Offset Correction for Coherently Modulated OFDM Systems in Wireless Communication," IEEE Vehicular Technology Conference (VTC), No. 2, Spring 2002, May 2002, pp. 777-781.

(Continued)

*Primary Examiner*—Dmitry H Levitan
(74) *Attorney, Agent, or Firm*—Hamilton, Brook, Smith & Reynolds, P.C.

(57) ABSTRACT

The invention relates to a novel methodology and apparatus for clock-offset compensation and common-phase offset correction in Frequency Division Multiplexing based wireless local area network (WLAN) environment, such as an Orthogonal Frequency Division Multiplexing (OFDM) environment. A curve fit, such as a threshold-based, least mean squares (LMS) fit of phase of the pilot sub-carriers in each OFDM symbol is used to estimate and counteract the rotation of the data sub-carriers due to residual frequency offset, low frequency phase noise, and clock offset. The invention is particularly well suited to wireless channels with multipath where pilots typically undergo frequency-selective fading. The thresholding LMS is implemented in a hardware-efficient manner, offering cost advantages over a weighted-LMS alternative. Additionally, the invention uses a unique phase-feedback architecture to eliminate the effects of phase wrapping, and avoid the need to refine channel estimates during packet reception.

20 Claims, 8 Drawing Sheets

U.S. PATENT DOCUMENTS

| | | |
|---|---|---|
| 6,650,617 B1 | 11/2003 | Belotserkovsky et al. |
| 6,801,586 B1 | 10/2004 | Imamura |
| 6,847,693 B1 | 1/2005 | Strait |
| 6,862,262 B1 | 3/2005 | Imamura |
| 6,891,792 B1 | 5/2005 | Cimini et al. |
| 7,106,709 B2 | 9/2006 | Davidsson et al. |
| 7,139,340 B2 | 11/2006 | Scarpa |
| 7,184,506 B2 | 2/2007 | Kolze |
| 2003/0117940 A1 | 6/2003 | Smallcomb |

OTHER PUBLICATIONS

Abhayawardhana, V.S., and Wassell, I.J., "Common Phase Error Correction with Feedback for OFDM in Wireless Communication," GLOBECOM 2002—IEEE Global Telecommunications Conference, No. 1, Nov. 2002, pp. 660-664.

* cited by examiner

PER VS. SNR FOR 64 QAM OFDM, RESIDUAL FREQUENCY OFFSET 3 KHz, 60 ns DELAY SPREAD, PHASE NOISE 2 DEGREES R.M.S. AT 20 KHz 3 dB BANDWIDTH.

RECEIVER ARCHITECTURE FOR PILOT BASED OFDM SYSTEMS

RELATED APPLICATION(S)

This application is a continuation of U.S. application Ser. No. 10/713,562, filed Nov. 14, 2003, issued on Nov. 18, 2008 as U.S. Pat. No. 7,453,792, which claims the benefit of U.S. Provisional Application No. 60/426,215 filed Nov. 14, 2002. The entire teachings of the above applications are incorporated herein by reference.

BACKGROUND OF THE INVENTION

Orthogonal frequency division multiplexing (OFDM) is a robust technique for efficiently transmitting data over a channel. The technique uses a plurality of sub-carrier frequencies (sub-carriers) within a channel bandwidth to transmit the data. In particular, these sub-carriers are arranged for optimal bandwidth efficiency compared to more conventional transmission approaches, such as frequency division multiplexing (FDM). Namely, the more conventional approaches waste large portions of the channel bandwidth to separate and isolate the sub-carrier frequency spectra, thereby avoiding inter-carrier interference (ICI). Notably, the frequency spectra of OFDM sub-carriers overlap significantly within the OFDM channel bandwidth. Despite this spectral overlap, OFDM allows, within a receiver, resolution and recovery of information originally modulated onto each sub-carrier.

These bandwidth efficiencies provided by OFDM, however, do result in some difficulties and practical limitations. In particular, OFDM systems are highly susceptible to frequency offset, phase noise perturbation, and clock offset. These impairments generally result in an unwanted rotation of the received sub-carriers of the OFDM signal (e.g., a rotation of the received constellations of the individual sub-carriers). The unwanted rotations can be attributed to a common phase rotation and a sub-carrier dependent phase rotation, which can result in inter-carrier interference (ICI). As long as the variance of the phase noise is small and the residual frequency offset is within 10 percent of the sub-carrier spacing, the effects of ICI can be ignored. In such a case, the effects of phase noise and residual frequency offset can often be lumped into a common rotation (CR) term, which affects all sub-carriers within an OFDM symbol equally. Phase noise generally refers to short-term random fluctuations in phase of an oscillator due to time-domain instabilities. Thus, the CR due to phase noise affects each OFDM symbol randomly, while the CR due to frequency offset accumulates over time.

The effect of the sampling clock offset, even though subtler, since it accumulates slowly over time, can be detrimental over a large number of symbols. The sampling clock generally refers to a timing source for an analog-to-digital (A/D) converter provided within any OFDM receiver. The A/D converter converts a baseband analog signal to samples representing a complex digital signal for further processing by the receiver. Since a time offset essentially translates to a sub-carrier dependent rotation (SDR) in the frequency domain, the sub-carriers at the edge of the OFDM spectrum can have their constellation rotated out of the reliable detection region. This can cause substantial packet error rates for higher-order digital modulations including quadrature amplitude modulation (QAM), such as 16 QAM or 64 QAM. Such higher-order modulation techniques are commonly used in OFDM systems. For example, OFDM systems configured to communicate using protocols described in the Institute of Electrical and Electronics Engineers (IEEE) 802.11a wireless local-area network (WLAN) standard can use BPSK, QPSK, 16 QAM, and 64 QAM modulations, with data throughput rates ranging from 6 to 54 megabits per second (Mbps).

One particular problem, however, associated with prior art solutions is their related cost and technical complexity. Prior art solutions to timing, frequency, and phase errors include the provision of highly-stable timing reference (e.g., a rubidium clock) that can maintain timing at a receiver accurately with respect to a remote transmitter. Other solutions include using a separate channel to broadcast precise timing information to the receivers. This approach unnecessarily wastes channel bandwidth. Yet other prior art solutions include providing precision phase locked loops (PLL) within the receiver.

Unfortunately, the problems related to cost and complexity of the prior art solutions are amplified in WLAN applications. WLAN systems generally rely on a limited number of access points, each capable of communicating with a large number of remote users. It is the cost and complexity of the remote users that must be kept to a minimum to ensure public acceptance and profitability.

SUMMARY OF THE INVENTION

The present invention solves the problem of phase errors due to frequency offset, phase noise, and timing by using known pilot sub-carriers transmitted every OFDM symbol to cancel the effects of the common and sub-carrier dependent rotations in a hardware-efficient, cost-effective, and robust manner. The phase error correction capability is built over a standard pilot-based OFDM packet receiver, such as an IEEE 802.11a receiver. It can be easily applied to any other pilot-based OFDM system such as an 802.11g (USA) receiver, and a European Telecommunications Standards Institute-Broadband Radio Access Networks (ETSI-BRAN) High Performance Radio Local Area Network/2 (HIPERLAN/2) receiver, or more generally to other pilot-based frequency-division multiplexed systems. More generally, the invention relates to receivers configured to receive frequency-division multiplex (FDM) signals that include pilot sub-carriers-in this sense, OFDM merely represents one particular subset of FDM.

In particular, the invention relates to a method for reducing phase error in a pilot-based orthogonal frequency division multiplexing OFDM receiver configured to receive OFDM symbols from a remote source. Each of the OFDM symbols generally includes one or more data sub-carriers and several pilot sub-carriers. First, the pilot sub-carriers are de-rotated by an accumulated common phase rotation, to reduce the overall phase offset to a residual phase offset representing the additional phase rotation incurred since receipt of the last symbol. This concept is referred to herein as "unwrapping" of the phase. Having removed the accumulated phase offset from the pilot sub-carriers, the respective phase value of each pilot sub-carrier is calculated. Generally, the phases are calculated by taking the arctangent of the complex pilot sub-carrier value.

Next, having determined a phase for each off the pilot sub-carriers, a mean phase value representative of the mean phase of the symbol is determined as the mean of the previously-calculated phase values of the pilot sub-carrier phases. In some embodiments, curve fitting is used to obtain a mean solution. In one embodiment, a least mean squared (LMS) solution is used to define a best-fit straight line through all of the phase points. The fitted curve (e.g., straight line) defines a slope and a zero-frequency crossing. Notably, the slope represents a phase gradient with respect to frequency and the zero-frequency crossing represents a residual common-phase rotation. The residual common phase offset is then added to an accumulated phase offset value stored in an accumulator. The updated accumulated phase error is then used to correct the phase offset for the one or more data sub-carriers. The process can be similarly applied to subsequently received symbols.

In some embodiments, de-rotating, or phase correcting for the common phase error is accomplished by multiplying each of the pilot sub-carriers by the same phasor having an argument defined by the accumulated common phase rotation.

Additionally, the curve-fitting solution can include thresholding. That is, the curve-fitting (e.g., LMS) solution includes an initial step of determining the magnitude of each of the pilot sub-carriers. The determined pilot sub-carrier magnitudes are individually compared to a predetermined threshold value (e.g., $\frac{1}{32}$ for an IEEE 802.11a symbol). A pilot sub-carrier is included in the curve-fitting solution if the pilot sub-carrier magnitude is greater than the predetermined threshold; otherwise, that pilot sub-carrier is not used. However, if the determined magnitude of less than two of the pilot sub-carriers of a given OFDM symbol is greater than the predetermined threshold, then all of the pilot sub-carriers are used in the curve-fitting solution, regardless of their respective magnitudes.

In some embodiments, such as an IEEE 802.11a embodiment, the curve-fitting solution can be simplified. For example, an LMS solution can be reduced by evaluating it for a predetermined number of pilot sub-carriers, each residing at a predetermined sub-carrier location. Thus, a pre-calculated a portion of the solution can be stored for later look-up. In one example of an IEEE 802.11a embodiment, the LMS solution can be obtained using one look-up, four additions, and five multiplications.

Having determined a respective common rotation, the data sub-carriers of an OFDM symbol can be corrected by multiplication with the same phasor having an argument defined by the updated accumulated common phase rotation. Additionally, a respective sub-carrier dependent rotation (SDR) can be determined for each of the number of data sub-carriers by further multiplying each data sub-carrier by a phasor having an argument defined by the calculated respective SDR. The SDR is obtained by multiplying the phase gradient by a number corresponding to the respective one of the number of data sub-carriers.

Additionally, the invention can further include a determination of a sample timing error for each OFDM symbol. For example, the sample timing error can be determined by comparing the LMS phase gradient to a predetermined reference slope. The result of the comparison can be provided to synchronization circuitry that selectively drops a sample if the phase gradient is greater than the reference slope, or inserts a sample if the phase gradient is less than the predetermined reference slope.

The invention can include synchronization circuitry receiving complex digital time domain samples of a pilot-based OFDM signal received from a remote source. The synchronization circuitry can be configured to derive coarse timing and frequency synchronization from the received samples. In this manner, the receiver can approximately align a local frequency source and/or timing reference to the respective timing source and/or timing reference of the remote source. A time-domain to frequency-domain converter, such as a fast Fourier transform (FFT) converts the complex digital time domain samples of each of the sequence of OFDM symbols to corresponding complex frequency domain samples. It is generally the complex frequency-domain digital samples that are processed by the receiver to fine-tune and update the synchronization and timing provided by the synchronization circuitry. Notably, in WLAN applications, OFDM receivers typically include a frequency-domain equalizer (FEQ) coupled to the output of the FFT. The FEQ can be used to correct for frequency selective amplitude adjustments, and phase delay due to multipath propagation effects.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
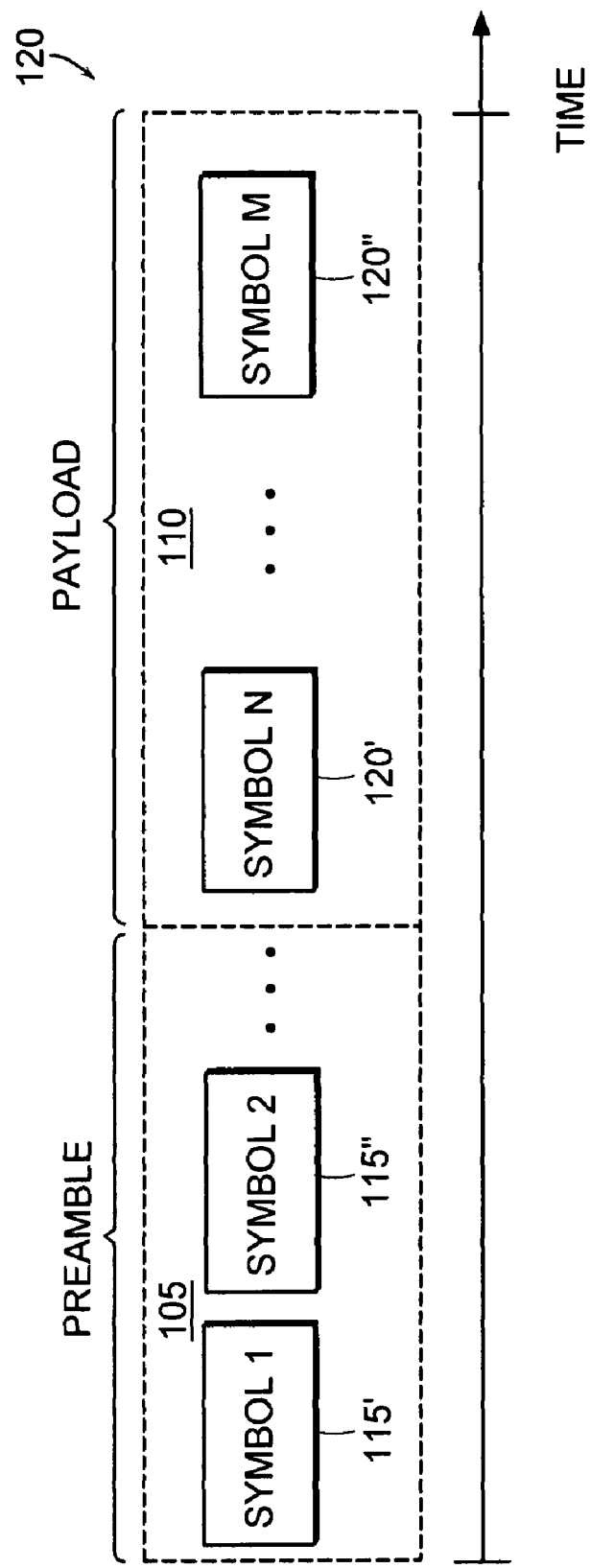
FIG. 1 is an illustration of an exemplary OFDM frame including a sequence of OFDM-modulated symbols.

Generally, the OFDM symbols are transmitted in sequences grouped into frames. An exemplary generic frame structure is illustrated in FIG. 1. An OFDM frame 120 includes a preamble 105 and a payload 110. The preamble 105 includes one or more OFDM symbols 115', 115" that are appended at the beginning of the frame 120. Among other functions, the preamble can include training symbols used by receivers to synchronize local frequency and clock sources. The payload 110 similarly includes one or more OFDM symbols 120', 120"; however, these symbols generally include the underlying data.

Figure 2A:
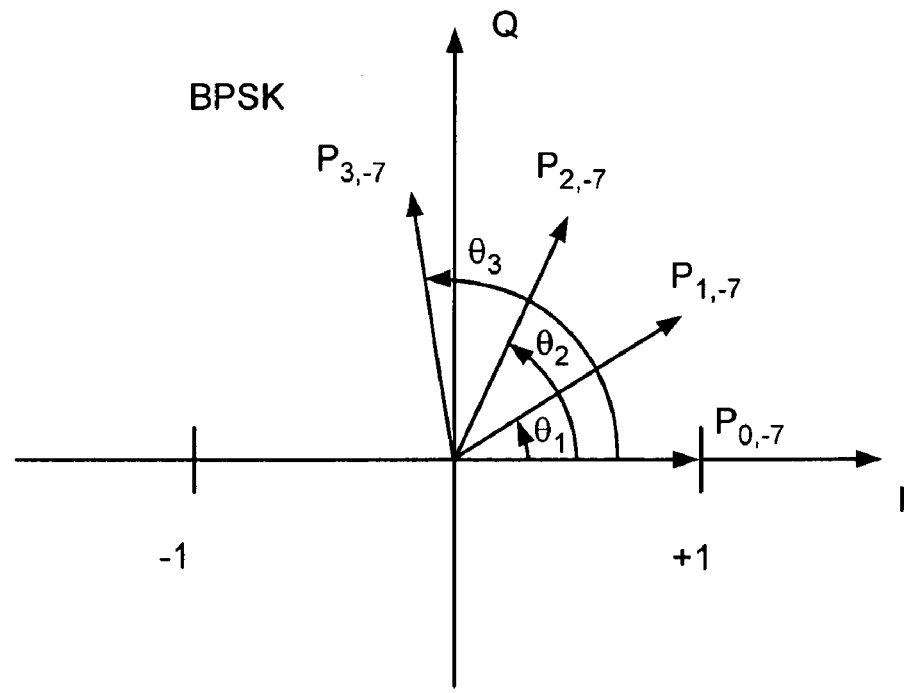
FIG. 2A is a schematic diagram illustrating the increasing phase offset experienced by an exemplary pilot sub-carrier over several consecutive OFDM symbols.

As an OFDM receiver typically synchronizes itself to a remote transmitter during the preamble 105 of an OFDM frame 120. As the receiver and transmitter frequency timing sources have different accuracies, there will be an unavoidable phase difference between the transmit and receive symbols that grows over time—at least until the beginning of the next OFDM frame when the receiver can resynchronize using that frame's preamble. Referring to FIG. 2A, an exemplary pilot sub-carrier is shown on an I-Q constellation for several sequential symbols of the same frame. The first index of the subscripts indicates a symbol number within the frame (i.e., symbol nos. 0-3). The second index of the subscript indicates that the pilot is at sub-carrier position "−7." As illustrated, $P_{-7}$ of the first symbol is received with a zero offset (i.e., at the +1 point on the constellation). The same sub-carrier is received for the next symbol with an additional phase delay of $\theta_1$. Likewise, the same sub-carrier for the next two symbols is received with respective phase delays of $\theta_3 > \theta_2 > \theta_1$. Notably, at some point (i.e., $P_{3,-7}$ as shown), the sub-carrier will incur a sufficient phase delay to rotate out of the decision region.

It would be possible to calculate the total (i.e., ever increasing) phase value for each symbol, but this complicates the process of determining the phase from the sub-carrier. Phase is typically calculated using an arctangent function. If the argument of the arctangent function is not restricted, the phase calculation will necessarily involve an additional step of determining which quadrant the sub-carrier resides in so that a proper sign can be applied to the result.

Figure 2B:
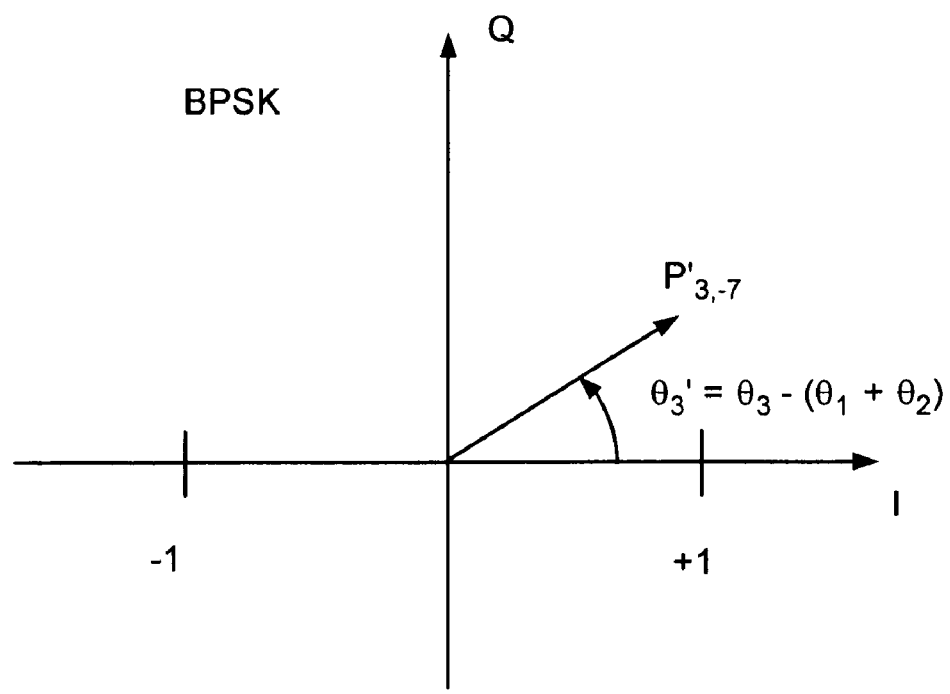
FIG. 2B is a schematic diagram illustrating a residual phase offset experienced by one of the exemplary pilot sub-carriers of FIG. 3, using the accumulated phase offsets determined from earlier-received OFDM symbols.

The invention relates to a novel methodology and apparatus for clock-offset compensation and common-phase offset correction in an Orthogonal Frequency Division Multiplexing (OFDM) based wireless local area network (WLAN) environment. Advantageously, the receiver adjusts the phase of each received symbol, using an estimate of the cumulative offset from the last symbol to reduce the magnitude of the phase, thereby simplifying the phase calculation. This adjustment of the phase to remove an accumulated phase is illustrated in FIG. 2B. Here the pilot sub-carrier that had originally been received with a phase delay greater than $\pi/2$, has now been adjusted to be well within the first quadrant. In particular, the phase drift will be limited symbol to symbol, such that the residual phase will most likely reside between 0 and $\pi/2$. Consequently, computation of the arctangent will be simplified, as it will always be a positive value.

A threshold-based, least mean squares (LMS) fit of phase of the pilot sub-carriers in each OFDM symbol can be used in some embodiments to estimate and counteract the rotation of the data sub-carriers due to residual frequency offset, low frequency phase noise, and clock offset. The invention is particularly well suited to wireless channels with multipath where pilots typically undergo frequency-selective fading. The thresholding LMS is implemented in a hardware-efficient manner, offering cost advantages over a weighted-LMS alternative. Additionally, the invention uses a unique phase-feedback architecture to eliminate the effects of phase wrapping, and avoid the need to refine channel estimates during packet reception.

Figure 3:
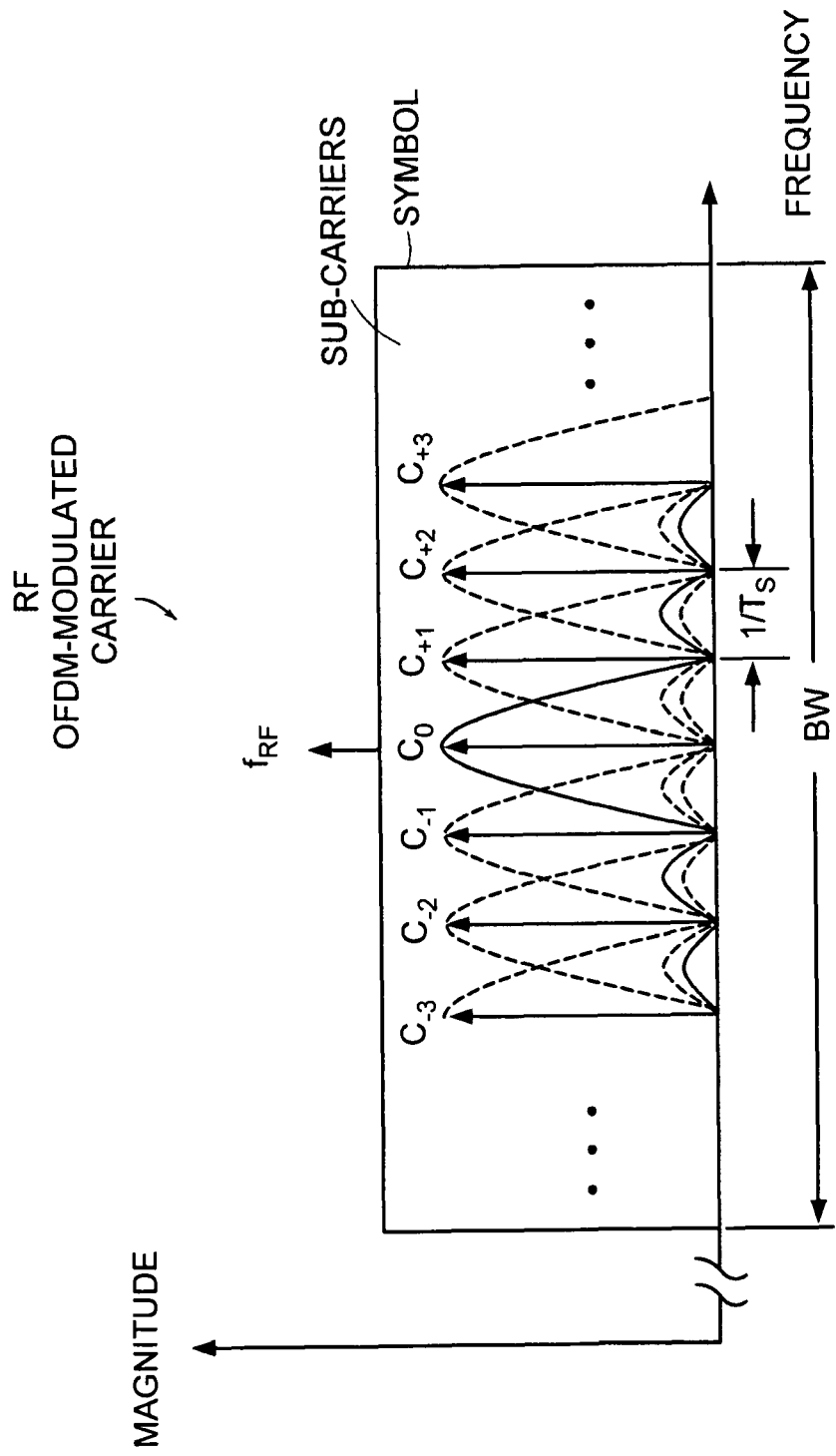
FIG. 3 is an illustration of an OFDM signal within an OFDM channel bandwidth showing the frequency domain positioning of OFDM sub-carriers and their modulated spectra.

Briefly describing the general principles of OFDM signal transmission, a typical OFDM signal includes 2N+1 OFDM sub-carriers, including a zero-frequency DC sub-carrier, which is not generally used to transmit data since it has no frequency and therefore, no phase. The sub-carriers have baseband frequencies of $f_k, = k/T_s$, where k is the frequency number and is an integer in the range of $-N \leq k \leq +N$. The phase and/or amplitude of each of the sub-carriers is individually modulated over the OFDM symbol interval, $T_s$, according to a selectable modulation scheme, such as binary phase shift keying (BPSK), quadrature phase shift keying (QPSK), and $2^m$-ary quadrature-amplitude modulation (QAM). Accordingly, each of the OFDM sub-carriers results in a sin $c(x)=\sin(x)/x$ spectrum in the frequency domain. Advantageously, the individual spectra of the sub-carriers are separated by $1/T_s$ in the frequency domain, such that the primary peak of each sub-carrier coincides with a null of the spectrum of every other sub-carrier. In this way, although the spectra of the sub-carriers overlap, they remain orthogonal to one another. Referring to FIG. 3, an exemplary arrangement of OFDM spectra is illustrated, residing within an OFDM channel bandwidth, BW, centered around a radio frequency (RF) carrier frequency, $f_{RF}$.

Figure 4:
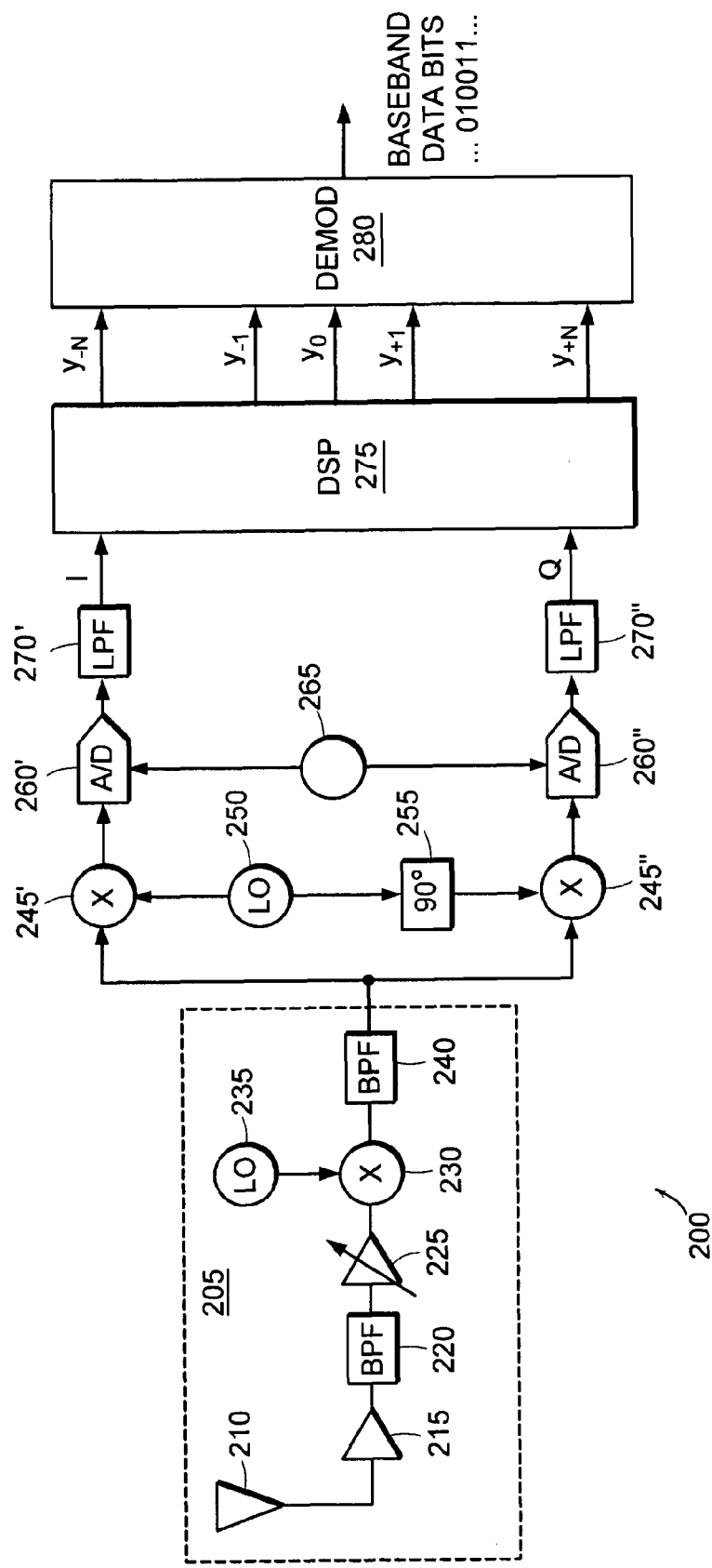
FIG. 4 is a block diagram of an exemplary OFDM receiver.

Turning now to FIG. 4, an exemplary OFDM receiver 200 is configured to receive an RF-modulated OFDM carrier signal from a remote location. An RF receiver 205 typically includes an antenna 210, a low noise amplifier (LNA) 215, an RF band-pass filter 220, an automatic gain control (AGC) circuit 225, an RF mixer 230, an RF carrier frequency local oscillator (LO) 235, and an analog band-pass filter 240. RF receivers are well known in the art and may include many variations, such as using a single mixing stage, and providing additional signal conditioning: e.g., amplifiers, filters, and/or attenuators.

Through the antenna 210, the RF receiver 205 couples in the RF OFDM-modulated carrier signal after it has passed through a wireless channel. Then, by mixing the received signal with a receive carrier of frequency $f_{RF}$, generated by the RF LO 235, the RF receiver 205 down-converts the RF OFDM-modulated carrier signal to obtain an intermediate frequency (IF) OFDM signal. Thus, one source of phase error results from the frequency difference between the receive carrier and the transmit carrier, thereby contributing to a carrier frequency offset, $ÿf_c$.

Further, the received IF OFDM signal then feeds into both a first IF mixer 245' and a second IF mixer 245", to be mixed with an in-phase IF signal and a 90° phase-shifted (quadrature) IF signal, respectively, to produce in-phase (I) and quadrature (Q) OFDM analog baseband signals, respectively. The in-phase OFDM signal that feeds into the first IF mixer 245' is produced by an IF LO 250. The 90° phase-shifted IF signal that feeds into the second IF mixer 245" is derived from the in-phase IF signal of the IF LO 250, by passing the in-phase IF signal through a 90° phase shifter 90 before feeding it to the second IF mixer 245".

The in-phase and quadrature OFDM signals then pass into respective analog-to-digital (A/D) converters 260' and 260", within which they are digitized at a sampling rate determined by a local clock circuit 265. The A/D converters 260', 260" produce digital samples that respectively form in-phase and quadrature discrete-time OFDM signals. The difference between the sampling (i.e., clock) rates of the receiver and that of the remote transmitter leads to another source of phase error, referred to as the sampling rate offset, $$ÿf_{ck} = ÿf_{ck\_R} - ÿf_{ck\_T}. \quad (1)$$

The unfiltered in-phase and quadrature discrete-time OFDM signals from the A/D converters 260', 260" then generally pass through respective digital low-pass filters 270' and 270". The output of low-pass digital filters 270' and 270" respectively provide filtered in-phase and quadrature samples of the received OFDM signal. In this way, the received OFDM signal, is converted into in-phase and quadrature samples that represent the real and imaginary-valued components, respectively, of the complex-valued OFDM signal. These in-phase and quadrature samples of the received OFDM signal are then delivered to a digital signal processor (DSP) 275 for further processing. Note that in some conventional implementations of the receiver 60, the A/D conversion is done before the IF mixing process. In such an implementation, the mixing process involves the use of digital mixers and digital frequency synthesizer. Also note that in many conventional implementations of the receiver 200, the A/D conversion is performed after the filtering.

Figure 5:
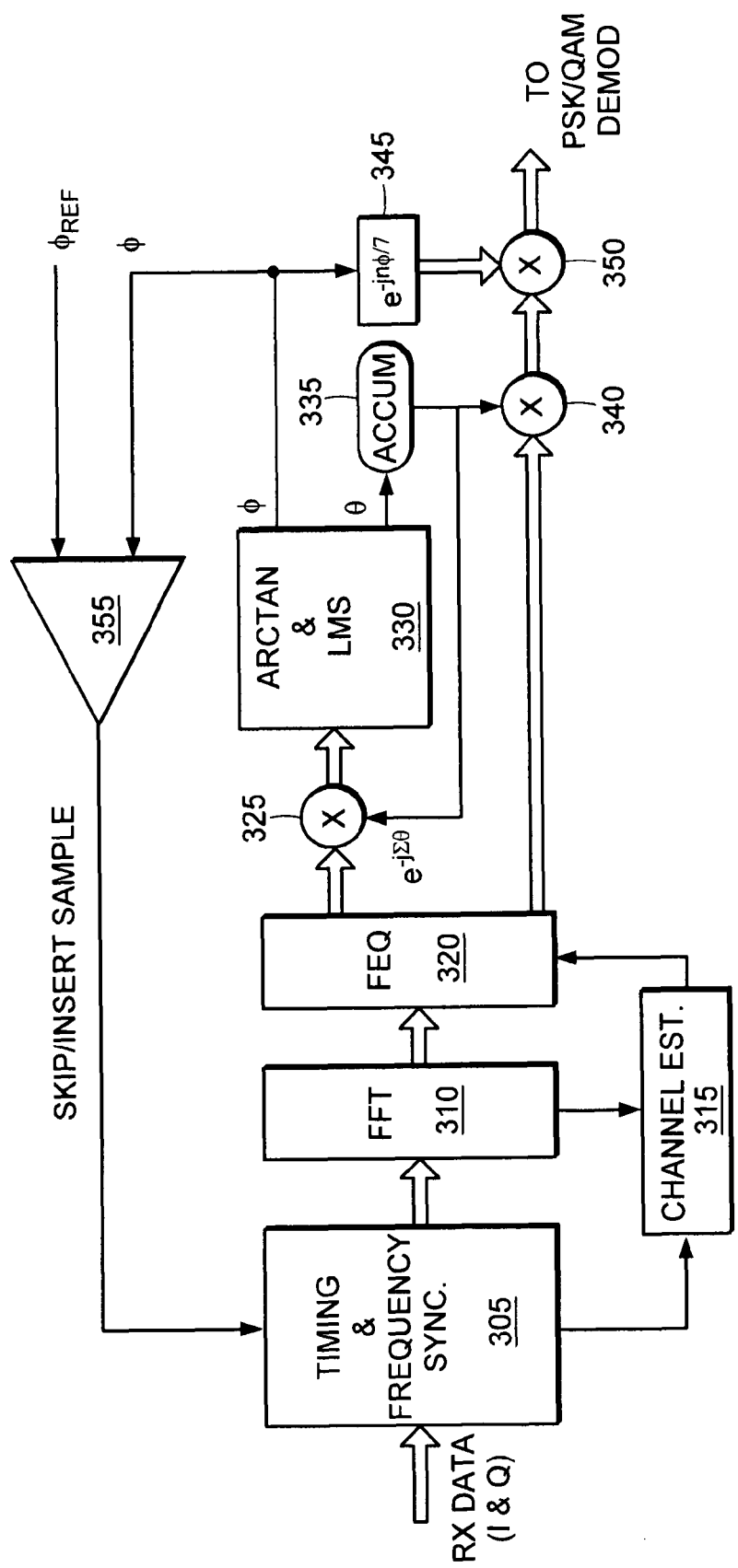
FIG. 5 is a block diagram of an exemplary phase-correction network configured within an OFDM receiver.

A more detailed block diagram of one embodiment of a DSP portion of an OFDM receiver is shown in FIG. 5. Generally, the DSP portion of an OFDM receiver includes a timing synchronization block, referred to hereinafter as a synchronizer 305, a fast Fourier transform (FFT) 310, a channel estimator 315, and a frequency-domain equalizer 320.

The synchronizer 305 receives data in the form of a time-domain complex digital sequence corresponding to an analog received OFDM signal. The received data generally includes separate I and Q data sequences. For example, the synchronizer 305 can be coupled to the filtered outputs of A/D converters 92, 93 as illustrated in FIG. 4. In operation, the synchronizer 305 obtains frequency information from the received data.

Typically, an OFDM protocol describes OFDM signals including sequences of OFDM symbols arranged into frames. The OFDM frames generally include a preamble that can be used by a receiver to synchronize the receiver's LO and/or sampling clock to that of the transmitter. For an IEEE 802.11a OFDM signal, the frame includes a preamble of 12 special symbols: 10 symbols representing repetitions of a short training sequence and two long training symbols. This training sequence provides a known modulation on a number of predetermined carriers at different frequencies. Thus, the training sequence can be used by the receiver for AGC convergence, diversity selection, timing acquisition, and coarse frequency acquisition. In particular, the synchronizer 305 receives the digital samples of the training sequence and adjusts the receiver's LO and sample clock using well-established techniques until the known transmitted signal is properly detected. As indicated, however, the resulting frequency alignment represents a coarse adjustment, because the local timing source is not exact and will drift over time with respect to the transmitter. Thus, as the first data symbols of the OFDM frame are received, the phase and timing may be adequate, but the error grows as subsequent symbols are received within the same OFDM frame. As the synchronizer 305 will likely not re-synchronize until a subsequent OFDM frame is received with a new training sequence, unacceptable error performance may result.

Additionally, the training sequence of the OFDM frame preamble can be used to determine an estimate of the channel propagation effects upon the signal. As wireless channels are subject to multipath distortion, the same transmitted signal will be received with different delays from reflected propagation paths, tending to spread each OFDM symbol in time. Further, any amplitude and/or delay effects are generally not uniform across the channel bandwidth. Accordingly, the channel estimator 315 receives information from the synchronizer 305, and the FFT 310 and uses the received information to estimate the effects of the channel. Further, the channel estimator 315 provides an output to the FEQ 320 that selectively provides amplitude and phase shifts to the different frequency-domain digital sequence to compensate for the channel effects. Thus, the output of the FEQ 320 provides a complex digital sequence corresponding to a channel-equalized frequency-domain representation of the received data. Preferably, the FFT 310 is clocked to provide an output sequence including multiple complex sample values, each complex sample value corresponding a different respective sub-carrier of the received OFDM signal.

The DSP further includes a first multiplier 325, a phase-error processor 330, an accumulator 335, a second multiplier 340, a sub-carrier dependent phase-error processor 345, and a third multiplier 350. Notably, the multipliers 325, 340, and 350 are three-terminal devices, each having two input terminals configured to receive respective input signals, and one output terminal configured to provide an output signal corresponding to the product of the two input signals. Thus, the first multiplier 325 receives as a first input samples from the FEQ 320 corresponding to one of the pilot sub-carriers. The first multiplier 325 simultaneously receives from the accumulator 335, a signal corresponding to an accumulated common phase error. Notably, the sign of the common phase error is inverted (i.e., negative), such that the output of the first multiplier 325 provides a signal corresponding to the pilot sub-carrier, de-rotated by the common phase error. The process can be repeated at the first multiplier 325 for the remainder of the pilot sub-carriers for the current OFDM symbol. Alternatively, the first multiplier 325 can include multiple multipliers, one for each of the pilot sub-carriers, such that the de-rotations of the multiple pilot sub-carriers are performed simultaneously.

In one embodiment, a phase-correction algorithm is implemented at the output of the FEQ 320, after the effects of multipath fading have been undone for all sub-carriers, as described above. The IEEE 802.11a standard uses a total of 52 sub-carriers per OFDM symbol. Thus, the sub-carrier reference number k is:

$$-26 \leq k \leq +26 \quad (2)$$

Figure 6:
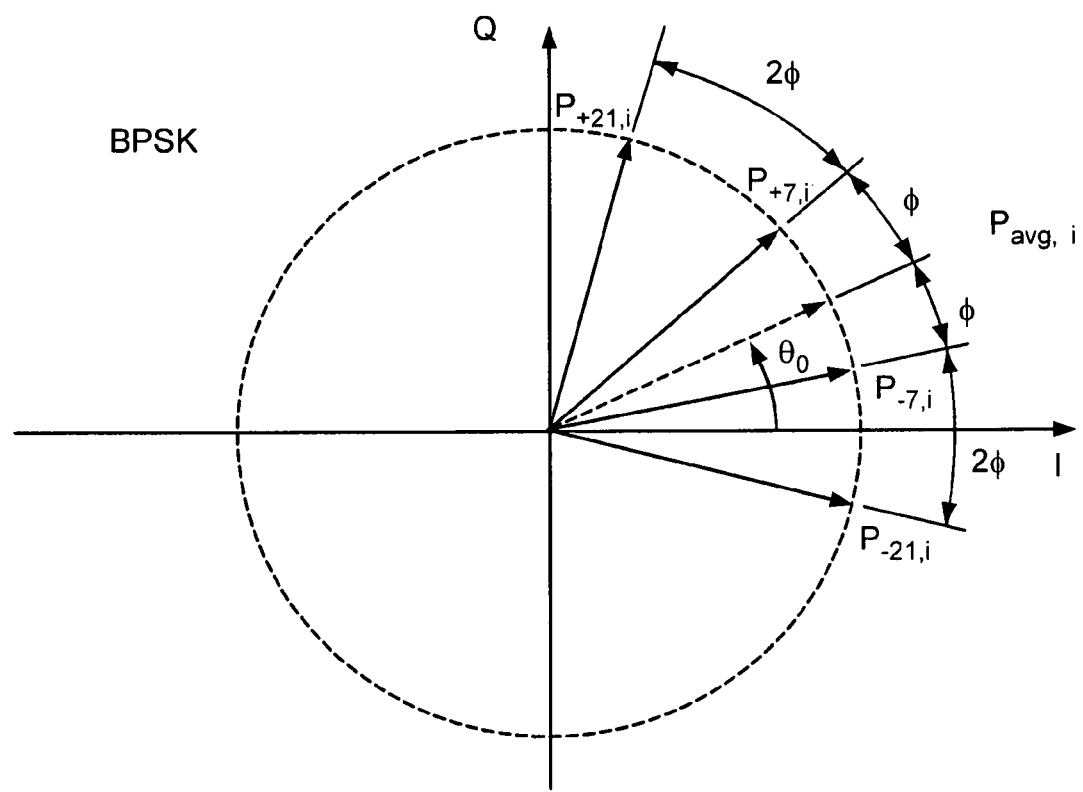
FIG. 6 is a illustration of the pilot sub-carriers of an IEEE 802.11a OFDM signal showing exemplary effects upon the phase of the pilot sub-carriers due to common rotation and sub-carrier dependent rotation.

Of these sub-carriers, 48 are used for data transmission, and four are used as pilots. The pilots are located at sub-carrier positions −21, −7, +7, and +21, and are modulated using a known modulation, such as binary phase shift keying (BPSK) (i.e., taking on values of +1/−1). The effect of the SDR is to spread the pilots around their mean in a circular fashion by an amount proportional to the pilot frequency. Thus, if the $7^{th}$ pilot of a particular OFDM symbol experiences an SDR of $\Phi$, the $21^{st}$ pilot is rotated by three-times $\Phi$. The effect of the CR is to rotate the mean of the pilots, as shown in FIG. 6, by the accumulated common rotation due to frequency offset. As illustrated, each of the pilot sub-carriers is represented as an individual phasor: $P_{-21}, P_{-7}, P_{+7}, P_{+21}$. As described above, the pilot sub-carriers were originally rotated to the +1 BPSK point (e.g., $\pi$ radians is added or subtracted from a pilot sub-carrier modulated with a −1). As the phasors are spread differently due to the sub-carrier dependent delays, they result having different angles as shown in the phasor diagram. Notably, a fictitious mean phasor can be drawn on the diagram, such that the other pilot sub-carrier phasors are distributed evenly about the mean. Thus, a phase gradient determined by the phase-error processor 330 and discussed in more detail below leads to phasor $P_{-7}$ as having a rotation of $-\phi$ with respect to the mean. Similarly, phasor $P_{-21}$ has a rotation of $-3\phi$ from the mean (or $-2\phi$ from $P_{-7}$) as the sub-carrier number (and sub-carrier frequency) is three times the value for $P_{-7}$. Likewise, the remaining pilot sub-carrier phasors $P_{+7}, P_{+21}$ are similarly disposed at $+\phi$ and $+3\phi$, respectively, from the mean. The angle between the mean and the +1 BPSK point represents the residual common rotation term.

First, utilizing the known values of the transmitted pilots, the received pilots are rotated to be around to the +1 point in the BPSK constellation. They are also de-rotated, or de-wrapped by the accumulated common rotation $\Sigma\theta$. This initial common de-rotation avoids phase wraps and a subsequent error in computing the gradient of the phases.

Referring again to FIG. 5, the phase-error processor 330 receives for each OFDM symbol the de-wrapped pilot sub-carriers from the first multiplier 325. The phase-error processor 330 then calculates the respective phases of each of the de-wrapped pilot sub-carriers using an arctangent function. For example, processing I and Q channels independently, the phase can be calculated as the arctangent (Q/I). Next, a least means square (LMS) fit is determined for the phase of the multiple pilot sub-carriers. The LMS solution results in a best-fit straight line through the phase values plotted versus sub-carrier number, or sub-carrier frequency. Consequently, the slope of the LMS solution is used to generate a gradient (Φ), which equals the sub-carrier dependent rotation experienced by the $7^{th}$ sub-carrier. Further, the LMS solution can be used to identify the residual phase offset (θ), as the zero-crossing value (i.e., the LMS predicted phase value at zero sub-carrier reference no., or zero frequency). The residual phase offset represents the common rotation term per OFDM symbol, after de-wrapping, according to the following equations, where $p_i$ are the pilots, $x_i$[−3, −1, 1, 3], and $\hat{p}$, $\hat{x}$ their means.

$$\phi = \frac{\sum_{i=0}^{3} x_i p_i - 4\hat{x}\hat{p}}{\sum_{i=0}^{3} x_i^2 - 4\hat{x}^2} \quad (3)$$

$$\theta = \hat{p} - \phi\hat{x} \quad (4)$$

Since some of the pilots might be significantly faded in a typical multipath scenario, their magnitudes can be first calculated and then compared against a predetermined threshold value before they are used in determining an LMS solution. Advantageously, applying thresholding to the LMS solution is significantly less expensive than implementing a weighted LMS, without incurring a significant degradation in performance.

In the thresholding method, only those pilots whose magnitudes are greater than a predetermined threshold value, such as 1/32, are selected for the LMS solution. If the amplitude of a pilot sub-carrier is less than the threshold value, it is not considered, or discarded prior to performing the LMS solution. However, if none of the pilot sub-carriers or just one pilot sub-carriers are above the threshold for a given OFDM symbol, then all of the pilots will be used for the LMS, regardless of their amplitude.

Further efficiencies can be realized with this approach. Namely, since a limited number of identified pilot sub-carriers, $x_i$, for each OFDM symbol are known a priori, the evaluation of the terms evaluated in the LMS solution will be limited in number. For example, considering that the IEEE 802.11a OFDM protocol uses four pilot sub-carriers, there are only $2^4 = 16$ possible pilot sets based on the weight threshold criterion. Thus, the computation of φ from equation 3 reduces to the following:

$$\phi = \sum_{i=0}^{3} p_i c_i - \hat{p}d \quad (5)$$

where $c_i$, d can be predetermined and stored in a look-up table (e.g., a register). Thus, the computation of the slope requires just one look-up, four additions and five multiplications. By way of contrast, a weighted-LMS calculation of the slope φ, as shown below, requires 18 multiplications and 18 additions, where $f_i$ are the fractional weights of the pilot sub-carriers.

$$\phi = \frac{\sum_{i=0}^{3} f_i x_i p_i - \sum_{i=0}^{3} f_i x_i \sum_{i=0}^{3} f_i y_i}{\sum_{i=0}^{3} f_i x_i^2 - \left(\sum_{i=0}^{3} f_i x_i\right)^2} \quad (6)$$

The phase error processor 330 performs the LMS calculation for every OFDM symbol and the common rotation is accumulated each time. That is, the accumulator 335 receives from the phase-error processor 330, the residual phase rotation determined using the LMS solution. The accumulator 335 then updates the common phase rotation term Σθ by adding the residual phase rotation to the currently-stored common phase rotation term.

The data sub-carriers are first de-rotated by the accumulated common rotation. The second multiplier 340 receives the data sub-carriers from the FEQ 320 at a first input and the accumulated common phase rotation value from the accumulator 335. The second multiplier 340 multiplies the two values, effectively de-rotating each of the data sub-carriers by the same common rotation term. The result is a rotation of each of the constellations of the multiple data sub-carriers by the same common rotation term. As described above, this correction compensates for some of the sources of error, such as an offset of the receiver's LO, because it applies evenly to all of the data sub-carriers.

Each of the data sub-carriers are next de-rotated by the SDR correction. The sub-carrier dependent phase-error processor 345 receives the phase gradient from the phase-error processor 330. For embodiments in which the gradient relates to the $7^{th}$ pilot sub-carrier, the sub-carrier dependent phase-error processor 345 first divides the gradient by 7, thereby normalizing it for later use with respect to any of the other sub-carriers. The sub-carrier dependent phase-error processor 345 then calculates the phase for each of the data sub-carriers by multiplying the normalized gradient by the sub-carrier number. For example, in an IEEE 802.11a OFDM system, the SDR for each sub-carrier is computed as the slope produced by the LMS divided by 7 and multiplied by the sub-carrier number.

For each data sub-carrier the third multiplier 345 receives at a first input, the de-rotated output sub-carriers from the second multiplier 340. The third multiplier 345 also receives a respective SDR value from the sub-carrier dependent phase-error processor 345. The third multiplier 345 multiplies the two values, effectively de-rotating each of the data sub-carriers by a different, respective SDR term. After being corrected by the common rotation and the SDR, the constellation is ultimately output to a demodulator, such as a phase shift keying (PSK)/QAM demodulator (not shown).

Turning next to timing errors, clock offset correction allows for fine-grained control over the sampling instants of the OFDM receiver. Timing errors can result from offsets between the clock 265 illustrated in FIG. 4, and the timing of the received symbols. Namely, the A/D converters 260 sample the baseband analog OFDM signal at a sample rate controlled by the clock 265. In particular, for an IEEE 802.11a OFDM receiver, the A/D converters 260 provide 80 samples for each received OFDM symbol. As described above, the clock offset leads to a sub-carrier dependent phase offset, characterized by a phase gradient.

Thus, in one embodiment, a comparator 355 receives at one input a phase gradient, φ, from the phase-error processor 330. Similarly, the comparator 355 receives at another input a reference slope, $\phi_{ref}$. The comparator 355 compares the two received input values and provides an output indicating whether a timing correction is required. As described above, the phase gradient can be generated by the phase-error processor 330 as a pure rotation of one of the pilot sub-carriers (e.g, the $7^{th}$ pilot sub-carrier). Accordingly, to calculate the sub-carrier frequency offset, the phase gradient can be multiplied by the particular sub-carrier number (e.g, multiplied by 7 for the $7^{th}$ pilot sub-carrier). Thus, the reference slope, $\phi_{ref}$, can be defined by:

$$\phi_{ref}=2\pi\times(7\times312.5\times10^3)\times(40\times10^{-9}). \quad (7)$$

Figure 7:
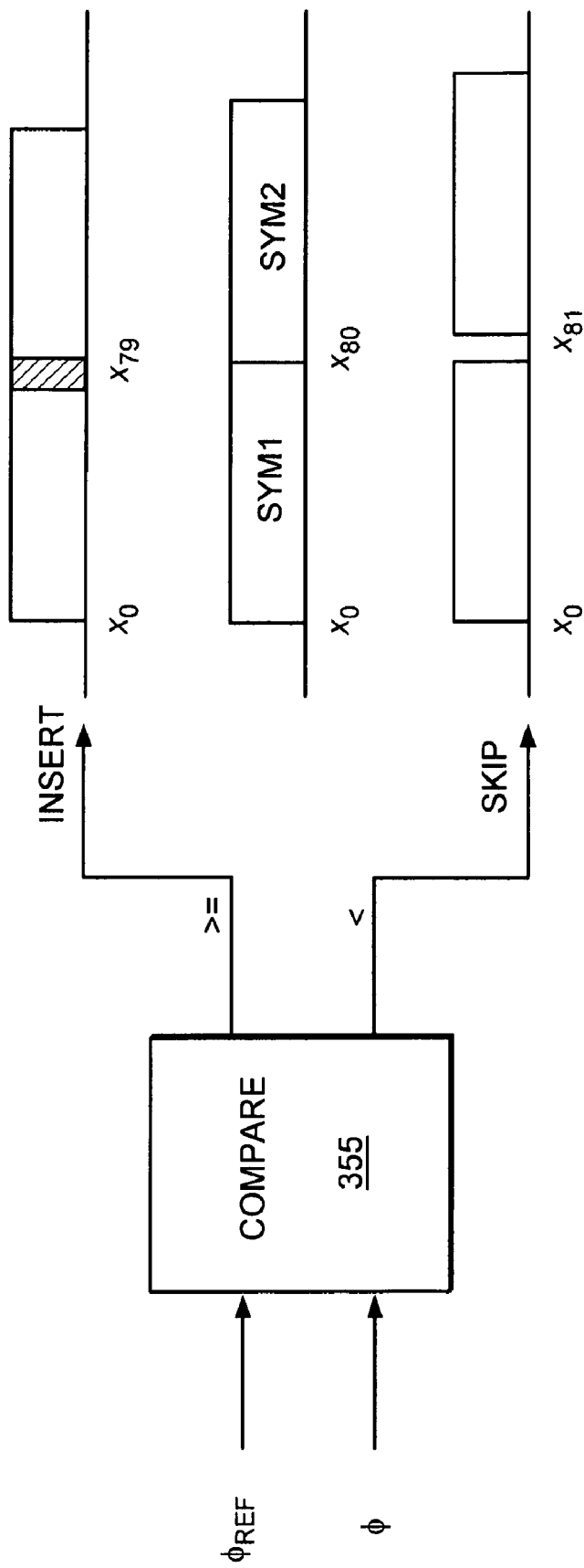
FIG. 7 is a more detailed schematic diagram illustrating the timing adjustments for one embodiment of a reference slope comparator.

Notably, 25 nanoseconds (ns) represents one half of the OFDM sampling interval used in an IEEE 802.11a system. Depending on the comparison, the sample-timing estimate for the next OFDM symbol is revised by one sample, as shown in FIG. 7. Namely, if $\phi >= \phi_{ref}$, the comparator 355 provides an output signal indicating that an extra sample should be inserted to preserve the sample timing for subsequent symbols. The synchronizer 305, illustrated in FIG. 5 receives the signal and in response, inserts an extra sample (e.g., repeats the $80^{th}$ sample as an $81^{st}$ sample, before the sampling of the next symbol begins) to preserve sample timing. Similarly, when the comparator 355 provides an output signal indicating that a sample should be dropped to preserve the sample timing for subsequent symbols, the synchronizer 305 receives the signal and removes, or "drops" a sample (e.g., skips the 80 sample) to again preserve sample timing for the subsequent symbols. The actual insertion and/or dropping of a sample can be done at the output of the synchronizer 305, so that there is no need to modify the channel estimates.

EXAMPLE

Figure 8:
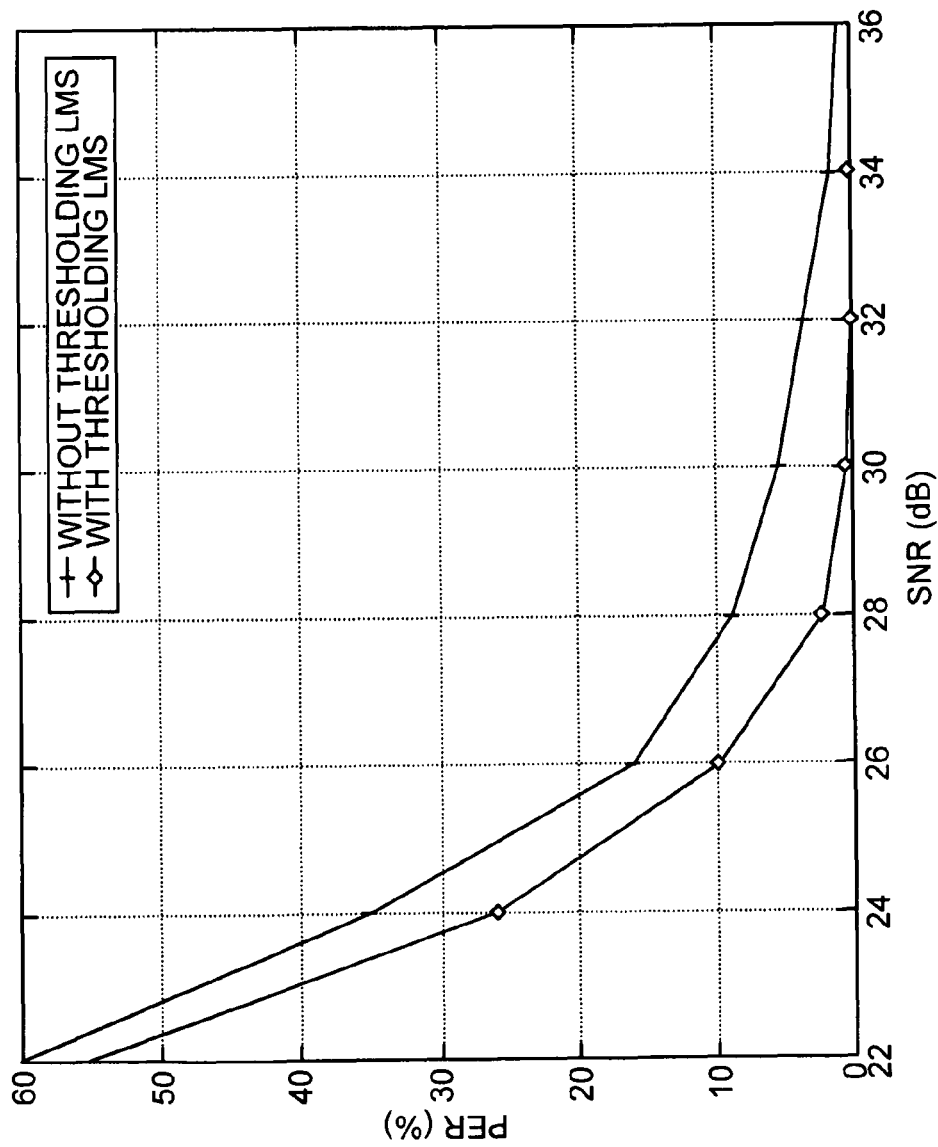
FIG. 8 is a plot illustrating the error performance of one embodiment of a 64 QAM OFDM receiver using a thresholding least mean square (LMS) approach, to a receiver that does not use the thresholding LMS approach.

Simulation results for a 64 QAM, IEEE 802.11a OFDM system, showing the received constellation with and without LMS thresholding are shown in FIG. 8. The scenario uses a typical delay spread of 60 ns, a residual frequency offset of 3 KHz, and 2 degree, root-mean-square phase noise with a 3 dB bandwidth of 20 KHz. Perfect timing synchronization is assumed. There is nearly a 2 dB improvement resulting from the thresholding LMS scheme, over using no thresholding.

In some embodiments, the DSP 100 can be implemented in software. In other embodiments, the DSP can more preferably be implemented in hardware. In yet other embodiments, the DSP can be implemented using a combination of hardware and software.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for reducing phase error in a pilot-based, frequency-division-multiplexing (FDM) receiver configured to receive FDM symbols from a remote source, each symbol including a data sub-carrier and a plurality of pilot sub-carriers, the method comprising:
   simultaneously rotating the plurality of pilot sub-carriers and the data sub-carrier by an accumulated phase offset associated with a carrier frequency offset between the FDM receiver and the remote source;
   calculating a residual phase offset for each of the plurality of rotated pilot sub-carriers;
   determining a mean residual phase offset for the calculated residual phase offsets of the plurality of rotated pilot sub-carriers; and
   updating the accumulated phase offset using the mean residual phase offset.

2. The method of claim 1, wherein rotating the plurality of pilot sub-carriers comprises multiplying each pilot sub-carrier by a phasor having an argument including an inverse of the accumulated phase offset.

3. The method of claim 1, wherein calculating the residual phase offset comprises calculating a respective arctangent for each of the rotated plurality of pilot sub-carriers.

4. The method of claim 1, wherein determining the mean residual phase offset comprises fitting a curve to the calculated residual phase offset versus pilot sub-carrier frequency for the plurality of pilot sub-carriers.

5. The method of claim 4, wherein the fitted curve defines a zero-frequency crossing indicative of the mean residual phase offset.

6. The method of claim 4, wherein fitting the curve comprises determining a least mean square (LMS) solution.

7. The method of claim 1, wherein rotating the data sub-carrier comprises multiplying the data sub-carrier by a phasor having an argument an inverse of the updated accumulated phase offset.

8. The method of claim 1, further comprising, prior to rotating the plurality of pilot sub-carriers by the accumulated phase offset, rotating the pilot sub-carriers to a predetermined region.

9. The method of claim 8, wherein the predetermined region corresponds to the "+1" decision region of a binary-phase-shift-keying (BPSK) constellation.

10. The method of claim 1, further comprising:
    detecting sample timing errors; and
    adjusting samples of the received FDM symbols responsive to detecting sample timing errors.

11. The method of claim 1, wherein the FDM symbols are orthogonal frequency division multiplexing (OFDM) symbols.

12. The method of claim 11, wherein the OFDM symbols are defined by a protocol selected from the group consisting of: IEEE 802.11a, IEEE 802.11g, and HYPERLAN/2.

13. An apparatus for correcting phase error in a pilot-based, frequency-division-multiplexing (FDM) receiver configured to receive FDM symbols from a remote source, each symbol including a data sub-carrier and a plurality of pilot sub-carriers, comprising:
    an accumulator storing an accumulated phase offset associated with a carrier frequency offset between the FDM receiver and the remote source;
    a first multiplier continuously coupled to the accumulator, the multiplier receiving a plurality of pilot sub-carriers and rotating the plurality of pilot sub-carriers by the accumulated phase offset;
    a phase error processor coupled to the first multiplier and the accumulator, to calculate a residual phase offset for each of the plurality of rotated pilot sub-carriers, to determine a mean residual phase offset for the calculated residual phase offsets of the plurality of rotated pilot sub-carriers, and to provide the mean residual offset to the accumulator for updating the accumulated phase; and
    a second multiplier continuously coupled to the accumulator, the second multiplier receiving the data sub-carrier and rotating the data sub-carrier by the accumulated phase offset.

14. The apparatus of claim 13, wherein multiplier receives from the accumulator, a phasor having an argument including an inverse of the accumulated phase offset.

15. The apparatus of claim 13, wherein phase error processor includes an arctangent function for calculating the residual phase offset for each of the rotated plurality of pilot sub-carriers.

16. The apparatus of claim 13, wherein phase error processor comprises a curve fitting function to the calculated residual phase offset versus pilot sub-carrier frequency for each of the plurality of pilot sub-carriers, the fitted curve defining a slope indicative of the phase gradient versus frequency and a zero-frequency crossing indicative of the mean residual phase offset.

17. The apparatus of claim 16, wherein a curve fitting function comprises a least mean square (LMS) function.

18. The apparatus of claim 13, wherein the FDM symbols are orthogonal frequency division multiplexing (OFDM) symbols.

19. The apparatus of claim 18, wherein the OFDM symbols are defined by a protocol selected from the group consisting of: IEEE 802.11a, IEEE 802.11g, and HYPERLAN/2.

20. A system for reducing phase error in a pilot-based, frequency-division-multiplexing (FDM) receiver configured to receive FDM symbols from a remote source, each symbol including a data sub-carrier and a plurality of pilot sub-carriers, the method comprising:
  means for simultaneously rotating the plurality of pilot sub-carriers and the data sub-carrier by a current accumulated phase offset associated with a carrier frequency offset between the FDM receiver and the remote source;
  means for calculating a residual phase offset for each of the plurality of rotated pilot sub-carriers;
  means for determining a mean residual phase offset for the calculated residual phase offsets of the plurality of rotated pilot sub-carriers; and
  means for the current accumulated phase offset using the mean residual phase offset.

* * * * *